(12) United States Patent
Vengrin

(10) Patent No.: US 11,112,882 B2
(45) Date of Patent: Sep. 7, 2021

(54) INPUT OR CONTROL DEVICE WITH VARIABLE CONTROLS CONFIGURATION

(71) Applicant: Alexander Vengrin, Luzna (SK)

(72) Inventor: Alexander Vengrin, Luzna (SK)

( * ) Notice: Subject to any disclaimer, the term of this patent is extended or adjusted under 35 U.S.C. 154(b) by 0 days.

(21) Appl. No.: 16/068,224

(22) PCT Filed: Jan. 8, 2017

(86) PCT No.: PCT/IB2017/050074
§ 371 (c)(1),
(2) Date: Jul. 5, 2018

(87) PCT Pub. No.: WO2017/118954
PCT Pub. Date: Jul. 13, 2017

(65) Prior Publication Data
US 2019/0011998 A1     Jan. 10, 2019

(30) Foreign Application Priority Data

Jan. 8, 2016   (SK) .................................. 50001-2016

(51) Int. Cl.
*G06F 3/023*     (2006.01)
*G06F 3/0484*    (2013.01)
(Continued)

(52) U.S. Cl.
CPC .......... *G06F 3/0238* (2013.01); *G06F 3/0202* (2013.01); *G06F 3/0416* (2013.01);
(Continued)

(58) Field of Classification Search
CPC .......... G06F 3/02; G06F 3/0202; G06F 3/023; G06F 3/0238; G06F 3/041; G06F 3/0416;
(Continued)

(56) References Cited

U.S. PATENT DOCUMENTS 5,235,328 A * 8/1993 Kurita ................... H03J 1/0025
340/12.28
5,450,078 A * 9/1995 Silva ..................... G06F 3/0238
341/23

(Continued)

*Primary Examiner* — Jason M Mandeville
(74) *Attorney, Agent, or Firm* — Defillo & Associates, Inc.; Evelyn A. Defillo

(57) ABSTRACT

Input or control device has a flat capacitively, or resistively, or inductively, or optically, or acoustically evaluated touch layer (2), which is continuously spread over the control zone (1), and also has a graphic layer (3) with a graphical representation of at least one button (4) and/or a key (5) and/or some other control element. Graphic layer (3) is adapted for removal and replacement with at least one different graphic layer, while the first graphic layer (31) and at least one other different graphic layer (32) have different number, and/or shape, and/or layout, and/or graphical representation of the button (4), and/or key (5), and/or some other control element. Evaluation unit (6) is interconnected with the touch layer (2) and is adjusted to the different evaluation of a touch, based on the current graphic layer (3). The graphic layer (3) can be located under or on top of the touch layer (2). For every graphic layer (3) has been assigned an interpretation definition, a map stored in the memory of the evaluation unit (6). The user of the controlled device can upload the interpretation definition into the device even later.

14 Claims, 4 Drawing Sheets

(51) Int. Cl.
*G06F 3/0488* (2013.01)
*G06F 3/02* (2006.01)
*G06F 3/041* (2006.01)
*G06F 3/044* (2006.01)

(52) U.S. Cl.
CPC ...... *G06F 3/04847* (2013.01); *G06F 3/04886* (2013.01); *G06F 3/044* (2013.01); *G06F 2203/04809* (2013.01)

(58) Field of Classification Search
CPC .... G06F 3/044; G06F 3/0488; G06F 3/04847; G06F 3/04886; G09G 2203/04809
USPC .................. 345/156, 168, 172, 173
See application file for complete search history.

(56) References Cited

U.S. PATENT DOCUMENTS

| | | | |
|---|---|---|---|
| 5,668,358 A | 9/1997 | Wolf et al. | |
| 6,274,825 B1 | 8/2001 | Aaltonen et al. | |
| 6,661,407 B2 * | 12/2003 | Severson | G06F 1/1607 345/173 |
| 6,686,908 B1 * | 2/2004 | Kobayashi | G06F 3/0238 341/22 |
| 7,892,096 B2 * | 2/2011 | Rigsby | G07F 17/32 200/276.1 |
| 8,482,540 B1 | 7/2013 | Natanzon | |
| 2002/0158849 A1 * | 10/2002 | Severson | G06F 1/1607 345/173 |
| 2004/0056781 A1 * | 3/2004 | Rix | G06F 3/0202 341/20 |
| 2006/0045599 A1 | 3/2006 | Ongkojoyo | |
| 2006/0256090 A1 * | 11/2006 | Huppi | A63F 13/02 345/173 |
| 2007/0012550 A1 | 1/2007 | Wohlfart | |
| 2008/0055265 A1 | 3/2008 | Bewley | |
| 2011/0050587 A1 | 3/2011 | Natanzon | |
| 2011/0298717 A1 * | 12/2011 | Liu | G06F 3/0224 345/168 |
| 2013/0346636 A1 | 12/2013 | Bathiche | |

\* cited by examiner

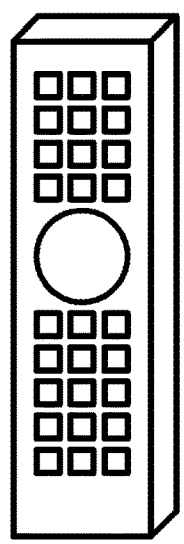
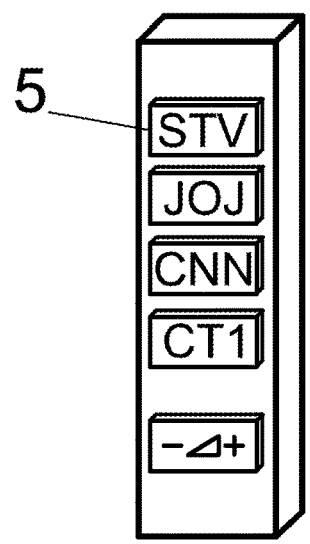
Fig. 9　　　　　　　　Fig. 10
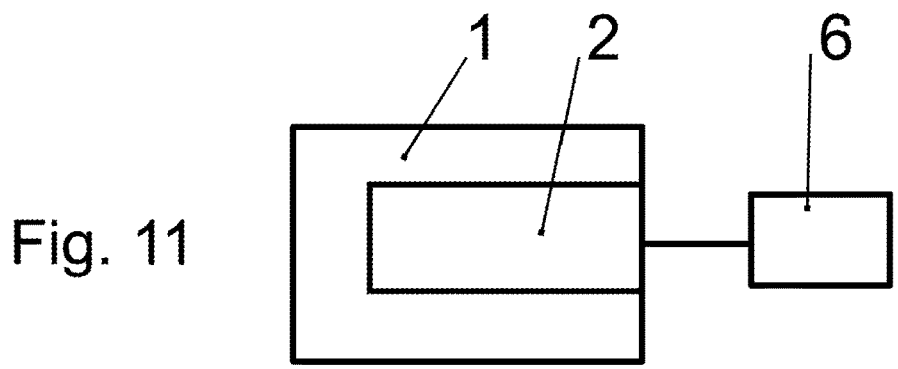
Fig. 11
Fig. 12

INPUT OR CONTROL DEVICE WITH VARIABLE CONTROLS CONFIGURATION

CROSS REFERENCE TO RELATED APPLICATION

This application is a national stage entry of PCT/IBP2017/050074 filed Jan. 8, 2017, under the International Convention claiming priority over Slovak Patent Application No. PP 50001-2016 filed Jan. 8, 2016.

TECHNICAL FIELD

The invention relates to an input or control device with keys, and/or buttons, and/or any other controls, and is used mainly for inputs, commands in various electrical and electronic components, devices, appliances, and systems, while input or control device has variable configuration of controls.

PRIOR ART

Various control or input devices such as keyboards, controls, areas with buttons, remote controls—with arrangement of keys and/or buttons designed according to assumed needs of the users—are used to control electronic and electrical devices. In case of computer keyboards, the layout and number of keys is relatively stable and various solutions differ in distribution of keys into groups with different key angle and distance by various ergonomic criteria, or various description of control elements, as for example in case of keyboards in various languages.

When designing control panels for various devices and appliances, they are designed so that all available functions of the device or appliance are available. This, depending on complexity and functions of the device or appliance, leads to relatively complex schemes of control with high number of buttons, keys, slide, or rotary selectors, and switches. Some designs have control zones divided; for example freely available commonly used keys, and advanced or service function keys available under a foldable cover. This process increases the demands on available space of the control zone and it also makes production more expensive.

In the industry, issues with complex control are very well known (e.g. Three Mile Island accident) and general trend is to simplify the way of control in devices and systems to maximum.

The solution according to publication US 2006/0045599 A1 enables to create various shaped buttons by merging the original basic buttons; the new buttons—with various labels, juts, or even Braille—have their function set-up in the respective controller. This can lead to change in number and shape of the keys; however it is not possible to completely change the layout of the keys outside the original grid with keys. The above mentioned solution is also complex and expensive, as it requires moulding many newly shaped keys. Similarly, limited merging of the originally square keys into new rectangular ones is known from file U.S. Pat. No. 5,668,358. After all, this approach is known also from other fields of technology, where for example in case of car dashboard controls as per US 2007/0012550 A1 or in case of mobile phones, as per U.S. Pat. No. 6,274,825 B1, has been created an external body which can be split rectangularly into several versions with various number of buttons. These technical approaches serve to simplify production; however they do not enable a later configuration change during the use.

The rise of touch screens caused that the controls changed into virtual keys and buttons displayed on a screen, and touch of fingers is detected at the respective spot. This enables total freedom in designing control zones; and controls in form of touch screens have spread massively. The disadvantage is that in many areas they represent an expensive, complex, and power demanding solution. A remote control with a touch screen would require frequent charging; a washing machine control with a touch screen is prone to chemical and water damage and older people can have troubles with fine control of touch screens. Touch screens used for control in industrial design are too complex, costly, and energy-intensive.

There is a high demand for an input device with high variability, universal for various application conditions, and not too intensive from power and software point of view, and a simple solution is not yet known. Also there is a demand for an option to change the control method for a device, appliance, or system not only during the design phase and production, but also later during its operation and use.

SUMMARY OF THE INVENTION

The above mentioned shortcomings are substantially remedied by an input or control device with variable controls configuration, particularly buttons and/or keys, which has a control zone with capacitively, or resistively, or inductively, or optically, or acoustically evaluated touch layer; the evaluation touch layer is connected to the evaluation unit to define the touch spot, based on this invention, the subject matter of which is that the evaluation touch layer covers continuously the control zone surface and above it or below is replaceable graphic layer, on which is a graphic representation of at least one control element, mostly a button and/or a key. The graphic layer is adjacent to the touch layer either from the bottom or from the top. The term adjacent in this document shall mean close location; however not necessarily contact location of the graphic layer to the touch layer. Interaction of the graphic layer with the touch layer must enable detecting position of fingers; potential gap and/or another layer between the graphic layer and touch layer should not prevent from detecting the finger position.

An input device, for example a keyboard, control panel, remote control, is adjusted for a change in configuration of keys, buttons, or other controls as needed or required by the current user, service technician, or anybody else.

Graphic layer is adapted for removal and replacement with at least one different graphic layer, while the first and at least one other different graphic layer have different number and/or shape and/or layout and/or visual display of controls, particularly buttons and/or keys. Also an arrangement is possible where one graphic layer can be firmly connected to the evaluation touch layer, while it can be covered with another replaceable graphic layer.

The graphic layer represents a physical medium with an image of a control element, or of several controls. The image is applied, engraved, or otherwise formed on a physical medium; usually it is firmly and steadily positioned on the physical medium. A map belongs to the graphic layer, and the map describes assigning of the individual parts of the graphic layer surface, or of the individual sensors, or switches to the respective controls. The individual controls, as well as their various activation methods, for example short touch, long touch, two short quick taps quickly one after another, slow slide, quick slide and so on, have in the map assigned respective functions of the controlled device. An integral part of the input or control device is a memory medium, where a map with assignments is stored. In particular cases we can call it an interpretation map, or interpretation definition.

If the replaceable graphic layer is located under the evaluation touch layer, this touch layer is transparent or at least translucent, so that the image of the control element is visible, particularly a button and/or a key on the graphic layer under the touch layer.

In case of reverse order, if the replaceable graphic layer is located on top of the touch layer, it can be non-transparent and the touch or movement of fingers is detected on a touch layer through a graphic layer which is reasonably thin and dielectric. In this case has been taken an advantage of the fact that changes in capacitance or any other physical quantity on the sensor, or set of sensors, in the touch layer are measurable already when a finger is near the touch layer; direct contact, or applying pressure, or force on the touch layer is not always needed. Graphic layer does not interfere in case of such measurable proximity in some technical solutions. High sensitivity and quick response rate of the touch layer enables to assign the controls also additional functions depending on whether a single touch was made or a series of several consequent touches, or long touch or a swipe on the touch screen or any combination of previous possibilities. Evaluation of touches can include also evaluation of several movement gestures on the surface.

An important feature of the submitted invention is use of a capacitively and/or in some other way evaluated touch layer, which however is not a part of the touch screen. The touch screen usually consists of touch layer on top or under the screen surface; the screen enables to create arbitrary display of controls. In fact even touch screens have only such displays, which had been pre-programmed and saved into the memory of the respective device. This fact has been utilized in the submitted invention, so that the individual versions of the controls are physically preserved in the graphic layer, for example on a paper or foil. Their preserving is energetically and materially very convenient and also easily understandable for a user. Inserting a specific graphic layer will create such a combination of controls, which are directly in the graphic layer steadily displayed.

The term touch layer refers to any layer that is able to detect spots where human fingers are applied, while a finger does not need to touch the touch layer. The fact that this touch layer is for example evaluated capacitively, means that a touch, or bringing a finger to its proximity, is evaluated based on capacitance changes in the respective spot, or in that area.

If a transparent or at least translucent touch layer is used, the existing touch layers of various dimensions can be used. The same touch layers, which are used in touch screens. Transparent touch layer can be equipped with backlight, which would increase legibility of the buttons and/or keys. Backlight can have timing so that it turns off after the time-limit expires. For activation, a touch anywhere on the touch layer is sufficient.

Touch layers for use in a device according to this invention can have various shapes or various dimensions. Usually their shape is rectangular quadrilateral.

The evaluation unit includes an interpretation definition, i.e. basically a map, an interpretation map for at least one currently inserted replaceable graphic layer. Interpretation definition, the map represents an instruction, based on which the detected spot of the touch is assigned to activation of that particular button, or key, or control element, location of which corresponds with the image on the graphic layer. The evaluation unit thus evaluates activation of controls, particularly buttons and/or keys based on current layout from the graphic layer. Between the graphic layer and respective interpretation definition (map) is unambiguous assignment relation.

Evaluation unit is usually a controller with the respective software. The input parameter for software activities is identification of the currently inserted graphic layer. Based on this identification, the software assigns to touches or to touch gestures respective functions of the controlled device. Capacitive or other sensor, or a system of sensors in the touch layer is connected to the evaluation unit which is adapted for various evaluations of a touch and/or a gesture based on the currently inserted graphic layer. The touch layer can also be designated as one touch sensor, even if it has for example four sensors in the corners, by means of which is identified the position of a touch on the surface.

The device can have stored in its memory several interpretation definitions for different graphic layers and that applies even in case that the device is delivered only with some graphic layers or just with one basic graphic layer. In case that another graphic layer is used, respective pre-stored interpretation definition will be used from the memory of the evaluation unit. Interpretation definitions can be inserted into the device even later, for example through downloading from the internet or from a removable memory card, memory stick, and so on.

The user can choose any of the graphic layers defined by the producer and respective pre-stored interpretation definitions in the memory of the device. The device also can have an open architecture, which would enable creating a new graphic layer even later and storing the software or storing a new interpretation definition corresponding to the new graphic layer.

The graphic layer can directly include a memory medium, where interpretation definition for that respective graphic layer is stored. When replacing the graphic layers, the new interpretation definition is uploaded automatically. In another case, new interpretation definitions can get into the device using a service device connected wirelessly or by a cable to the input device.

The most common will be use of capacitively evaluation touch layer, which is used in touch input devices, touch screens and so on. Mass production of these elements has reduced costs and increased responsiveness and reliability. In the present invention, the touch layer is connected to the physical medium displaying currently one specific layout of buttons, and/or keys, and/or any other controls.

Part of the touch surface or the whole touch surface can serve be used as a touchpad, trackpad. The dimension and location of such a motion detector in relation to buttons, and/or keys, and/or other controls on the graphic layer can vary a lot.

There is also a possible arrangement where the touch layer includes capacitive 2a or other switches 2b, or sensors 2c with regularly or irregularly distributed conductors or flat electrodes 2d. In such case the graphic layer can be a part of a flexible membrane with a depiction of at least one button, and/or key, and/or some other control. Flexible membrane is adjacent on top of the switches or sensors. The first flexible membrane is adjacent and covers the grid of switches or sensors and is adapted for removal and replacement with at least one different (other) flexible membrane, while the first and at least one other flexible membrane have different number and/or shape and/or layout and/or visual display of controls. Switches or sensors are connected with the evaluation unit, which is adapted for different activation evaluation of the respective switch or sensor based on the currently inserted flexible membrane.

Input or control device with variable controls configuration also enables an arrangement where one graphic layer is steadily attached to the touch layer so that a different graphic layer can be put on top of this one. This is for example possible, because the primary, first graphic layer is located under a transparent touch layer. Another solution is a thin first graphic layer located on top of touch layer, while this first graphic layer does not prevent proper functioning of the second graphic layer, which is positioned on the first graphic layer. It is also possible to overlay graphic layers on top of each other multiple times, if responsiveness of the respective touch layer enables it.

An important feature of the invention is an option to change subsequently controls observed from outside. Subsequently means that a change is possible after the device had been produced and had been shipped to a user. For example the device is delivered with the first removable graphic layer which would correspond to the most desired design of controls. At the same time or subsequently the user is provided at least one different graphic layer, with a different design of controls. The difference lies mainly in number and shape of controls that will be designed for a specific user group. For example input device for senior customers will have lower number of buttons, the buttons will be large with clear graphical representation of the respective functions.

Input or control device based on this invention can include one or several elements serving for mechanical, acoustic, optical, or other feedback to the user on activation of the controls. It is for example a vibration motor, speaker, buzzer, LED diode, or a display.

Input or control device can include one or more communication interfaces for one-way or two-way communication with the controlled device, or another control device. It can for example receive a command from other input, or control device, or receive information on the status of the controlled device.

Input or control device can conveniently include one or more sensors of various physical quantities, or chemical substances, as for example proximity sensor, motion detector, light sensor, moisture meter, $CO_2$ or temperature sensor, or any other input and/or output element, as for example a microphone, speaker, or a display.

It is convenient to use an input or control device based on this invention, particularly in devices, that need sometimes a change in control. Input or control device with variable controls configuration enables to add a new function to a host device. The host device will accept the needed update of its firmware and the input device will use a new graphic layer with controls also for the added function.

This approach based on this invention can be applied in various fields and for various user groups. At one available surface of the control zone, i.e. within one permanent evaluation touch surface can be created a wide range of configurations. Therefore the same panel can have a design for children where functions not suitable for children would not be available, or can have design for service access, where higher level functions would be available. Nevertheless, the controls still keep their real, non-virtual graphical representation, and the whole device has minimal energy consumption.

The evaluation unit is adapted to correctly interpret the signal from the activated sensors or switches, based on the identification of the currently used graphic layer, in accordance with the graphical representation and location of the buttons on the graphic layer. This task can be performed via software that evaluates the position of the activated sensors or switches and subsequently assigns them to the zones of the respective controls. Software or evaluation process implemented through a computer program is therefore an important component of a device based on this invention; the software using current interpretation definition provides output data about what controls were activated, or which gestures were performed, when moving a finger.

In one of the possible executions a flexible membrane is used, which is affecting the capacitive grid with flat electrodes or conductors; the flexible membrane bends due to pushing of a button and gets closer to the flat electrodes or conductors on the capacitive grid. This reduction in the mutual distance of the electrode and the flexible membrane causes change in capacitance, and that is detected as activation by the evaluation unit. Evaluation unit evaluates which button, or key, or a control corresponds to the activated capacitive sensor. Pressing a larger button causes activation of several capacitive sensors assigned to the respective button, evaluation criterion may include a set of conditions, under which the situation is evaluated as pressing the button.

The graphic layer can be constructed variously depending on the areas of application. It can be made of ordinary bond paper, glass, or plastic, it can be equipped with a repeatedly adhesive layer that will make it adhere to the touch layer. In case that a transparent touch layer is used and graphic layer is located under the touch layer, the graphical representation on the graphic layer is protected from the effect of a touch by the touch layer itself. In case that the graphic layer is located on top of the touch layer, the graphic layer can be protected from touch effects, for example from damage, by a protective layer.

The graphic layer can have a convenient design—a both-side version. Images of the controls are then applied on the both sides of a flat physical medium. The benefit of such graphic layer is that the different graphic layer is always ready to be activated, it is enough just to turn the physical medium and put in the information on validity of the respective interpretation map. Such an example can be a bilingual keyboard.

Flexible membrane can have various versions based on the area of use. It can be a flat strip made of semi-rigid material where the buttons are printed, or the flat strip is adjusted for a user to print out the position of the buttons themselves based on their needs. In another version, the flexible membrane can include juts oriented upwards, which compose the surface of a button. Also flexible membranes can be used, which include inserted protruding buttons or keys made of different material.

Graphic layers composing control panels, observable from outside, can be distributed in various ways. The device can be already delivered with several graphic layers. For example a copying machine would have inserted a graphic layer with the most common layout of buttons at the time of shipping, and the packing would include two other different graphic layers. Even though the copying machine has a vast number of functions as magnifying, reducing, contrast, number of copies, sorting copies, majority of copying machines only operate with basic functions during their service life. One different graphic layer is therefore intended to simplify the control and contains only two buttons, the first is an order to copy, the second incrementally defines the number of copies. Another different graphic layer has on the other hand many smaller buttons, which would enable scanning into a computer and other functions. User who uses such a copying machine can decide what graphic layer to insert into the control zone.

The touch layer can recognize identity of the inserted graphic layer, for example using a shape code at its edge, or input of a numeric code of the inserted graphic layer can be required. Recognition of the currently inserted layer can be performed in such way, that the device can detect removing of a graphic layer, for example using a micro-switch pushed by a jut on the graphic layer, and after the graphic layer is inserted, firstly the recognition process starts and it requires pushing gradually all buttons in certain direction. Subsequently, based on comparison with a list of available graphic layers, the evaluation unit can recognize which current graphic layer is inserted into the control zone and this layout is expected until the next removal of the graphic layer. Removal and reinserting of a graphic layer starts a new recognition process.

Recognition of the current graphic layer can be made easier via arrangement, where the graphic layer contains a contactless memory chip with an identifier, for example RFID chip, from which the respective data can be contactless uploaded into the device.

If the input device is a part of the device having a communication module, for example connection to a network or to internet, this interface can be used for setting identity of the currently inserted graphic layer, but this interface can also be used for re-programming of the evaluation unit, so that it is able to process even new configurations exceeding the configurations originally stored in the memory during production.

Graphic layer, even in form of a flexible membrane, can consist of several layers, where the basic layer has mainly a bearing function and on that layer is placed a layer with an applied graphical representation depicting buttons, for example as a line at the edge of a button and it also includes a label or symbol of the button. This layer can be delivered even separately, or a user can print their own design with labels for the controls on a printer. The top protective layer that protects the printed design would conveniently follow.

Input or control device with variable controls configuration, particularly buttons and/or keys, based on this invention can be applied for example in case of home appliances, in control of air conditioning, heating, control of lighting, or blinds, as well as in industry, for example in production lines, machine tools, or personal devices, such as a computer, tablet, mobile phone, television set, game console, or for hand tools, in remote controls, in case of single-purpose or multi-purpose controls, switches, dimmers, thermostats, etc.

The device based on this invention can be interconnected with the controlled device in different ways. It can be a fixed part of the controlled device or, it can be connected wirelessly, or by a cable, or by means of a local, or remote, or internet network and it can be one-way or both-way connection.

Input or control device with variable controls configuration can be advantageously used in a situation where several users use different functions, or where the preferences of users change, or where the firmware changes, or where functions of a device are added, or where sometimes the way of use of the device changes, for example according to a season summer/winter, working days/days off, school year/holidays.

Benefit of the invention is high variability of the control design and an option to change it later, after the device, appliance, or system had been delivered to a user. The input device is at the same time simple, energy efficient, and resistant to environmental effects. It can be used as a local control, or a remote control, or a part of a communication equipment, or part of a home appliance, or as a part of computer or part of computer accessories, as a control element in a car and basically everywhere, wherever a fixed or virtual keyboard, or a control panel is used.

DESCRIPTION OF DRAWINGS

The invention is explained in detail using FIGS. 1 to 16. Specific shape of the controls, buttons, keys, displayed icons, or displayed alphanumeric labels, is only illustrative in nature and shall not be regarded as narrowing the scope of the protection. In case of graphic or verbal labels, trademarks of respective owners can be concerned; their depiction on the Figures shall not express any connection between the invention and the owner of the respective trademark.

FIG. 9 depicts a TV remote control in a classic configuration with many keys;

FIG. 10 depicts the very same remote control in the configuration with graphic layer adjusted for an elderly user;

FIG. 11 depicts schematically a connection of a touch layer with an evaluation unit;

FIG. 12 depicts overlay of a flexible membrane which includes a graphic layer and a flexible medium;

EXAMPLES OF REALIZATION OF THE INVENTION

Example 1

Figure 1:
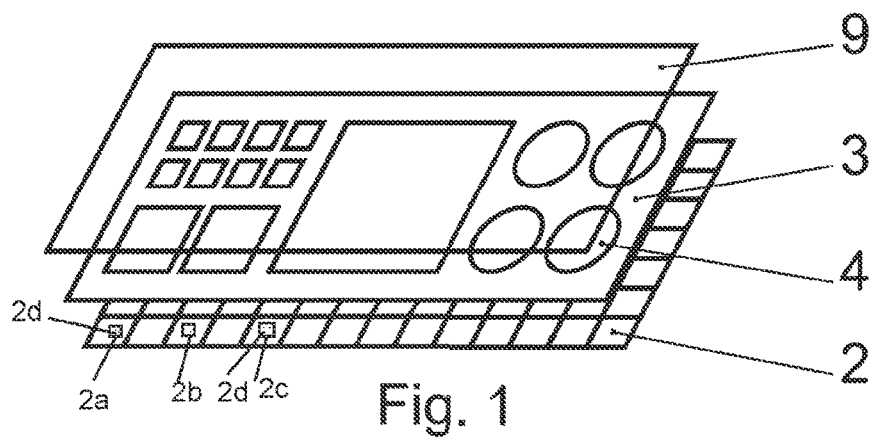
FIG. 1 is a 3-D (three-dimensional) view of a graphic layer when it is spread above the touch layer. On the touch layer is depicted an example of a grid with flat electrodes, where the electrodes themselves are not shown for better clarity.
Figure 2:
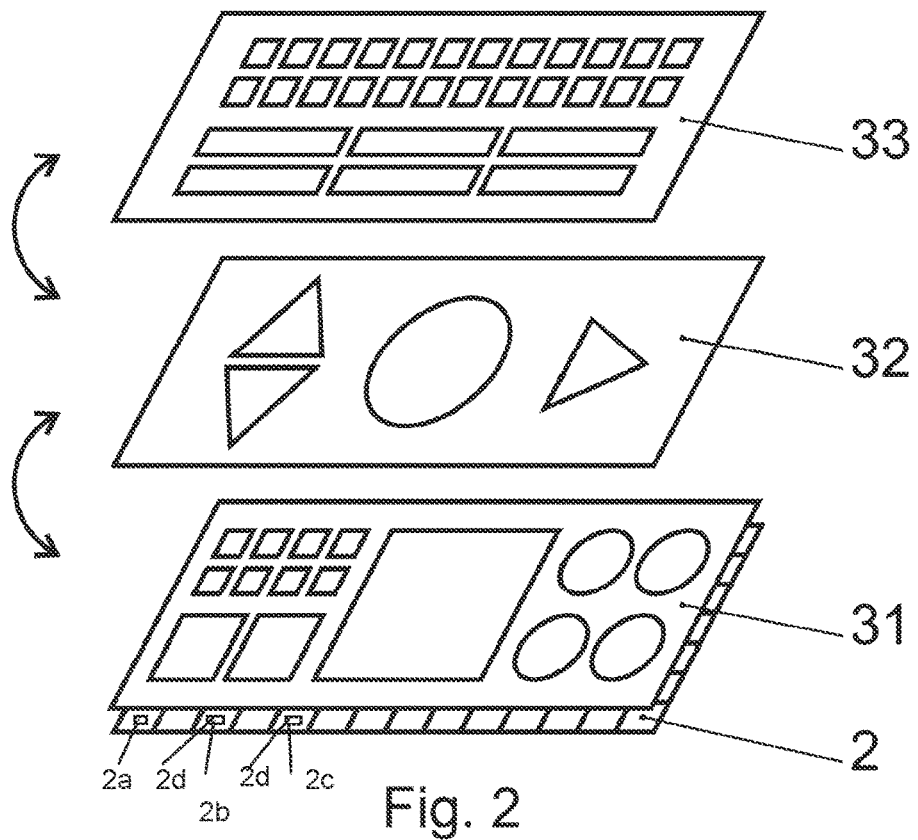
FIG. 2 depicts a device with the graphic layer, which is from the top adjacent to the capacitive evaluation touch layer, where in the upper part of the image are depicted examples of two different graphic layers.

In this example, based on FIGS. 1, 2, and 11, the input device is used in the control of the multi-functional copier, scanner and communication device. Control zone 1 is a stable part of the top part of the device.

On the capacitive evaluation touch layer 2 is located adjacent graphic layer 3, covered with a protecting layer 9. It provides for permanency of characters and images printed on the graphic layer 3. The accessories of the device include also two different graphic layers 32, 33. Those can replace the original standard graphic layer 31, which will result in a different buttons configuration 4.

To the touch layer 2 is connected the evaluation unit 6, which interprets touches, movements, or gestures of a user as activation of the respective buttons 4 and therefore the respective functions of the device.

Example 2

Figure 3:
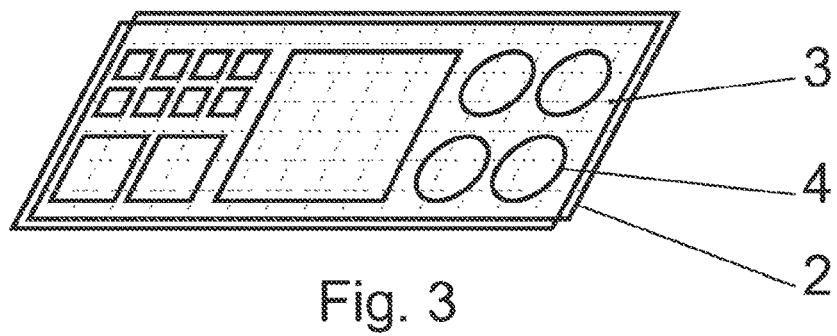
FIG. 3 depicts a layout where the graphic layer is inserted under the transparent touch layer. On the touch layer, the dashed lines depict a system of touch sensors which in reality are not visible to the user; 00

In this case, based on FIGS. 3 and 11, the input device is used in the control of a multi-functional copier, scanner, and communication device, similarly to the Example 1, but the graphic layer 3, is inserted under the capacitive evaluation touch layer 2. That is attached to the device with a tilting holder. The touch layer is transparent with a backlight. After inserting the graphic layer 2 in form of a printed paper, the touch layer 2 is tilted back to the device. Through the touch layer 2 can be seen the current distribution of the buttons 4.

Example 3

Figure 4:
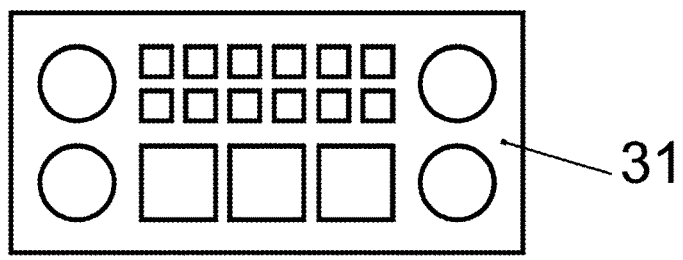
FIG. 4 is a view of the input device on an electric device, which serves for entertainment and playing music and videos.
Figure 5:
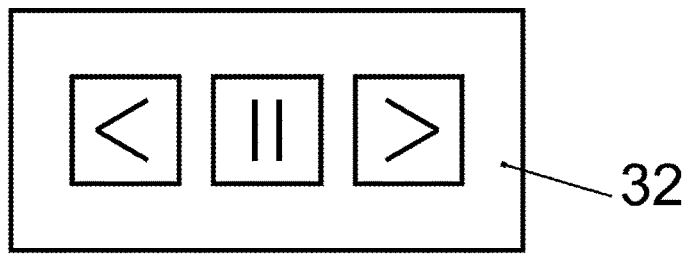
FIG. 5 depicts the input device of the same device with a first design and function of the control panel.
Figure 6:
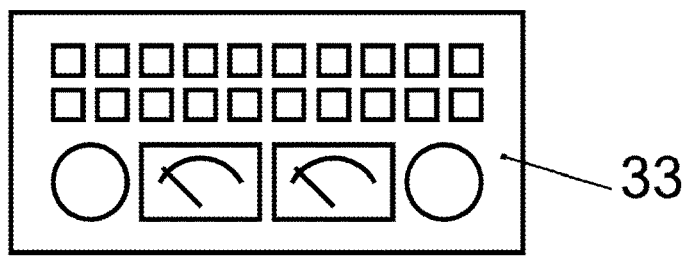
FIG. 6 depicts the input device of the same device with a second design and function of the control panel.

In this Example, based on FIGS. 4 to 6, the input device is part of an audio-visual system. Different graphic layers have different number and shape of buttons 4.

Example 4

Figure 7:
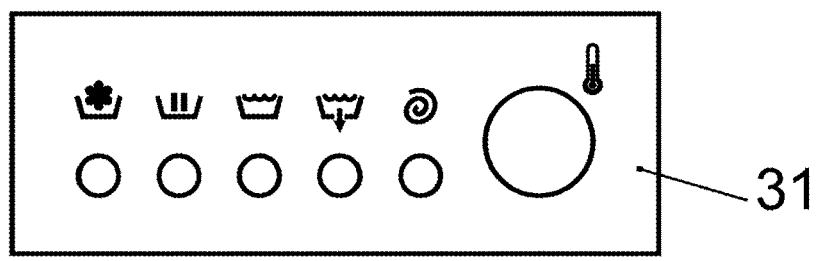
FIG. 7 depicts an input device of a washing machine.
Figure 8:
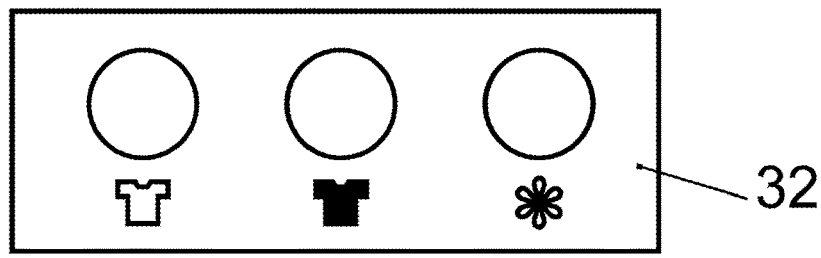
FIG. 8 depicts an input device of a washing machine with simplified control.
Figure 13:
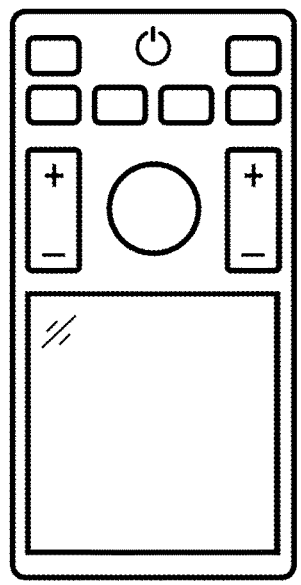
FIG. 13 depicts a remote control with a first graphic layer which means with different configurations of controls. The large quadrilateral elements in represent a touchpad.
Figure 14:
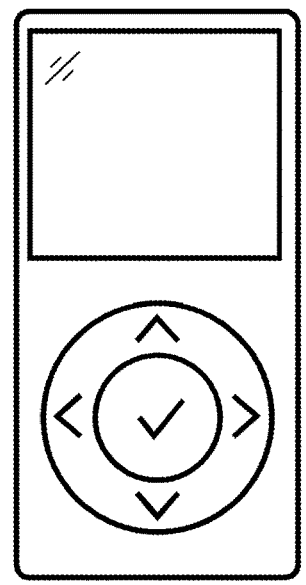
FIG. 14 depicts a remote control with a second graphic layer which means with different configurations of controls. The large quadrilateral elements in represent a touchpad.
Figure 15:
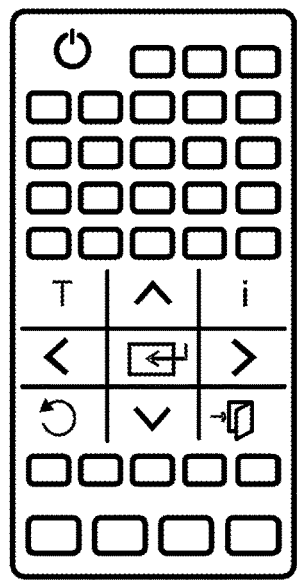
FIG. 15 depicts a remote control with a third graphic layer which means with different configurations of controls. The large quadrilateral elements in represent a touchpad.
Figure 16:
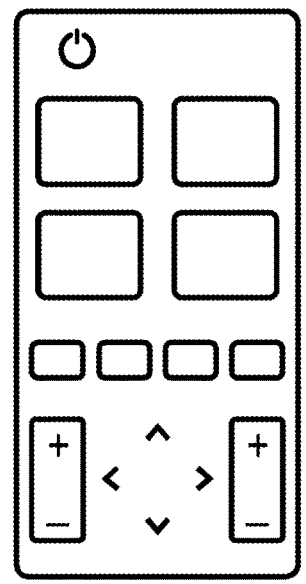
FIG. 16 depicts a remote control with a fourth graphic layer which means with different configurations of controls. The large quadrilateral elements in represent a touchpad.

Automatic washing machine has an input control panel as depicted in FIGS. 7 and 8. Graphic layer 3 is in this case, as depicted in FIGS. 8 and 12, part of a flexible membrane, where are formed juts on three buttons 4. The flexible membrane has a basic plastic layer 7, layer 8 with a depiction applied and a protective layer 9.

Example 5

Input device has a form of a TV remote control, which can be used with a common layout as per FIG. 9, or in a simplified version as per FIG. 10.

Example 6

Input device with variable controls configuration has in this case a form of a bilingual keyboard. The first graphic layer 31 with images of keys 5 in one language is applied on one side of the physical medium. A different graphic layer 32 with images of keys 5 in another language is applied on the other side of the physical medium.

Example 7

The input device with variable controls configuration has in this case a form of a wall control unit with fixed first graphic layer 31 in form of a numeric keyboard, which serves as a device for input of an identification code for a different replaceable graphic layer 32. Proximity sensor and light sensor will provide for illumination of the control after detecting a person close to the control.

Example 8

The input device with variable controls configuration in this example has a form of a remote control containing a motion detector and a light sensor. When an operator lifts the control, the motion detector activates the control from the zero-energy consumption status into the operational status. Light sensor provides for backlight of the control buttons when ambient light does not suffice.

INDUSTRIAL APPLICABILITY

Industrial applicability is obvious. Based on this invention, it is possible to industrially and repeatedly configure and use input or control device with variable controls configuration, particularly buttons, and/or keys.

LIST OF REFERENCE SYMBOLS

1—control zone
2—evaluation touch layer
capacitive 2a
switches 2b
sensors 2c
regularly or irregularly distributed conductors or flat electrodes 2d
3—graphic layer
  31—first graphic layer
  32—different graphic layer
  33—another different graphic layer
4—button
5—key
6—evaluation unit
7—basic layer
8—layer with a graphical representation applied
9—protective layer
PC—personal computer
RFID—Radio Frequency IDentification
touch pad/trackpad—input device for a computer replacing a computer mouse;
firmware—usually a fixed program, which controls internally an electronic device.

The invention claimed is:

1. An input or control device with variable controls configuration comprising:
  a control zone including an evaluation touch layer without a touch screen, wherein the evaluation touch layer detects spots where human fingers are close to, without the human finger touching the evaluation touch layer;
  a first graphic layer having a graphic representation of at least one control element, the first graphic layer is firmly connected to the evaluation touch layer, the evaluation touch layer is continuously spread through a surface of the control zone;
  an evaluation unit connected to the evaluation touch layer;
  a memory connected to the evaluation unit having an interpretation definition;
  a second graphic layer covering the first graphic layer, the second graphic layer is removable from the first graphic layer;
  at least one sensor including flat electrodes located on the evaluation touch layer, the at least one sensor is chosen from a proximity sensor, a motion sensor, a light sensor, a moisture sensor, a monoxide of carbon sensor, a temperature sensor, or combination thereof;
  wherein the second graphic layer is designed to cover the first graphic layer, the first graphic layer allows proper functioning of the second graphic layer;

wherein the first graphic layer and the second graphic layer have different numbers, and/or shapes, and/or locations, and/or graphic representations of the variable controls configuration;

wherein the evaluation unit is programmed according to the first graphic layer or according to the second graphic layer, and is adjusted for different evaluation of a touch or a touch gesture at the same spot on the evaluation touch layer based on the first graphic layer if the second graphic layer is not entered or based on the second graphic layer if the second graphic layer is entered;

wherein the first graphic layer or the second graphic layer is a part of a flexible membrane and the evaluation touch layer has capacitive and/or inductive, and/or resistive, and/or mechanical switches with regularly distributed flat electrodes;

wherein the flexible membrane has a bearing basic layer made of a semi-rigid material, the flexible membrane has a layer with applied graphical representation of at least one button or a key, on the layer where the graphical representation is conveniently a protective layer;

wherein the first graphic layer has a flat physical medium attached to the evaluation touch layer, the physical medium has at least on one side located an image of at least one control element including at least one of a button or a key, an interpretation map is assigned to the physical medium, the interpretation map is located in the memory medium, the interpretation map defines assignment of the individual parts of the evaluation touch layer surface or the at least one sensor on the touch layer to the respective controls, that are assigned to the respective function of the controlled device.

2. The input or control device with variable controls configuration of claim 1, wherein the evaluation touch layer is a one piece touch sensor.

3. The input or control device with variable controls configuration of claim 1, wherein the first graphic layer or the second graphic layer is dielectric and is located on top of the evaluation touch layer.

4. The input or control device with variable controls configuration of claim 1, wherein the first graphic layer or the second graphic layer is assigned an interpretation definition in a memory of the evaluation unit.

5. The input or control device with variable controls configuration of claim 1, wherein the first graphic layer or the second graphic layer has a machine-readable identifier.

6. The input or control device with variable controls configuration of claim 5, wherein the second graphic layer includes a memory medium for storing the interpretation definition.

7. The input or control device with variable controls configuration of claim 1, wherein the input or control device has an interface for an additional transfer of interpretation definition to the evaluation unit.

8. The input or control device with variable controls configuration of claim 1, wherein the second graphic layer has a repetitive adhesive layer for connection with the evaluation touch layer.

9. The input or control device with variable controls configuration of claim 1, wherein part of the evaluation touch layer is in the evaluation unit evaluated as a touchpad.

10. The input or control device with variable controls configuration of claim 1, wherein a medium with the second graphic layer is double-sided, where a first side of the second graphic layer has an image different from an image on a second side of the second graphic layer.

11. The input or control device with variable controls configuration of claim 1, wherein the input or control device has at least one element providing mechanical, conveniently vibration feedback and/or at least one element providing acoustic feedback and/or at least one element providing optical, conveniently light feedback to the user.

12. The input or control device with variable controls configuration of claim 1, wherein the input or control device is a control device for air conditioning or heating or a control device of lighting or blinds or it is a remote control or a wall control unit or is part of a home appliance, or as a part of a computer or part of computer accessories, or as a control element in a car.

13. A method of evaluation of a touch or a touch gesture on the touch layer (2) in the device of claim 1, wherein the touch or the touch gesture is translated into an information on activation of a control element, particularly the button, or the key, based on their location on the first graphic layer or the second graphic layer.

14. An input or control device with variable controls configuration consisting of:
a control zone including an evaluation touch layer without a touch screen, wherein the evaluation touch layer detects spots where human fingers are close to, without the human finger touching;
a first graphic layer having a graphic representation of at least one control element, the first graphic layer is firmly connected to the evaluation touch layer, the evaluation touch layer is continuously spread through a surface of the control zone;
an evaluation unit connected to the evaluation touch layer;
a memory connected to the evaluation unit having an interpretation definition;
a second graphic layer is located on the first graphic layer, the second graphic layer is removable from the first graphic layer;
at least one sensor including flat electrodes located on the evaluation touch layer, the at least one sensor is chosen from a proximity sensor, a motion sensor, a light sensor, a moisture sensor, a monoxide of carbon sensor, a temperature sensor, or combination thereof;
wherein the second graphic layer is designed to cover the first graphic layer, the first graphic layer allows proper functioning of the second graphic layer;
wherein the first graphic layer and the second graphic layer have different numbers, and/or shapes, and/or locations, and/or graphic representation of the variable controls configuration;
wherein the evaluation unit is programmed according to the first graphic layer or according to the second graphic layer, is adjusted for different evaluation of a touch or a touch gesture at the same spot on the evaluation touch layer based on the first graphic layer if the second graphic layer is not entered or based on the second graphic layer if the second graphic layer is entered;
wherein the first graphic layer or the second graphic layer is a part of a flexible membrane and the touch layer has capacitive and/or inductive, and/or resistive, and/or mechanical switches with regularly distributed flat electrodes;
wherein the flexible membrane has a bearing basic layer made of a semi-rigid material, the flexible membrane has a layer with applied graphical representation of at least one button or a key, on the layer where the graphical representation is conveniently a protective layer;

wherein the first graphic layer has a flat physical medium attached to the evaluation touch layer, the physical medium has at least on one side located an image of at least one control element including at least one of a button or a key, an interpretation map is assigned to the physical medium, the interpretation map is located in the memory medium, the interpretation map defines assignment of the individual parts of the touch layer surface or the at least one sensor on the touch layer to the respective controls, that are assigned to the respective function of the controlled device.

* * * * *